US007223486B2

(12) United States Patent
Dorren et al.

(10) Patent No.: US 7,223,486 B2
(45) Date of Patent: May 29, 2007

(54) ENCAPSULATING DEVICE AND BATTERY PACK INCLUDING SUCH AN ENCAPSULATING DEVICE

(75) Inventors: Bastiaan Hendrik Peter Dorren, Brussels (BE); Eddy Blansaer, Oostakker (BE); Luc Jozef Louise Van Den Bossche, Lebbeke (BE); Dominique Wojciechowski, Saint-Sauveur (BE)

(73) Assignee: STMicroelectronics NV., Amsterdam (NL)

( * ) Notice: Subject to any disclaimer, the term of this patent is extended or adjusted under 35 U.S.C. 154(b) by 255 days.

(21) Appl. No.: 10/402,395

(22) Filed: Mar. 28, 2003

(65) Prior Publication Data

US 2004/0018396 A1 Jan. 29, 2004

(30) Foreign Application Priority Data

Mar. 29, 2002 (EP) .................................. 02290807

(51) Int. Cl.
*H01M 14/00* (2006.01)
*H02J 7/00* (2006.01)

(52) U.S. Cl. ........................... 429/7; 320/134; 320/136

(58) Field of Classification Search .................... 429/7; 320/134, 136
See application file for complete search history.

(56) References Cited

U.S. PATENT DOCUMENTS

| | | | | |
|---|---|---|---|---|
| 3,992,225 A | * | 11/1976 | Sykes | 429/1 |
| 4,247,603 A | * | 1/1981 | Leffingwell et al. | 429/1 |
| 5,298,347 A | | 3/1994 | Aksoy et al. | |
| 5,432,017 A | | 7/1995 | Hassemer et al. | |
| 5,736,271 A | * | 4/1998 | Cisar et al. | 429/96 |
| 5,929,600 A | * | 7/1999 | Hasegawa | 320/112 |
| 5,978,230 A | | 11/1999 | Dando et al. | |
| 6,161,281 A | | 12/2000 | Dando et al. | |
| 6,187,472 B1 | | 2/2001 | Shiota et al. | |
| 6,356,448 B1 | | 3/2002 | DiBene, II et al. | |
| 2001/0033476 A1 | | 10/2001 | DiBene, II et al. | |
| 2001/0036066 A1 | | 11/2001 | DiBene, II et al. | |
| 2002/0008963 A1 | | 1/2002 | DiBene, II et al. | |
| 2002/0016092 A1 | | 2/2002 | DiBene, II et al. | |
| 2002/0021556 A1 | | 2/2002 | DiBene, II et al. | |
| 2002/0057554 A1 | | 5/2002 | DiBene, II et al. | |

OTHER PUBLICATIONS

European Search Report from priority European application No. 002290807.3, filed Mar. 29, 2002.

* cited by examiner

*Primary Examiner*—Patrick Joseph Ryan
*Assistant Examiner*—Thomas H. Parsons
(74) *Attorney, Agent, or Firm*—Lisa K. Jorgenson; James H. Morris; Wolf, Greenfield & Sacks, P.C.

(57) ABSTRACT

The invention relates to an encapsulating device for electrical circuitry, which includes at least one pin which is directly attachable to metal such as by welding. This is especially suitable for battery pack applications whereby such an encapsulating device is incorporated in the battery pack and is used as an encapsulating device for the battery protection circuitry.

20 Claims, 5 Drawing Sheets

BP

ENCAPSULATING DEVICE AND BATTERY PACK INCLUDING SUCH AN ENCAPSULATING DEVICE

BACKGROUND OF THE INVENTION

1. Field of the Invention

The present invention relates to an encapsulating device for electronic circuitry as well as to a battery pack.

2. Technical Background

Encapsulating devices are extensively used within the micro-electronics industry such as to protect one or more integrated electronic circuits, abbreviated with IC, placed within this encapsulating device, and to allow connections from leads of another component on for instance a printed circuit board, to be made with the inner pads of the integrated circuit itself. The leads of the encapsulating devices in this way allow to connect the inner pads of the electrical circuitry within the encapsulating device physically to other circuitry external to this encapsulating device. Encapsulating devices are available in a lot of different embodiments, all serving particular purposes. Yet a characteristic property of all of them is that the pins of these encapsulating devices, serving to contact the encapsulating device to an external component on for instance a printed circuit board, are such that adhesion to another conductor such as pins or conductors on a printed board, always occurs via another material such as soldering, using solder paste or conductive glue.

For the special case of protection circuits used in battery packs, whereby an input pin of such a protection circuit is to be coupled, usually via a thin metal plate or strip, to one the leads of a battery, and an output of this protection circuit is to be connected with other circuitry for portable applications, for instance telephone circuitry in a cellular phone, this protection circuit is generally placed on a printed circuit board. This is for instance described in U.S. Pat. No. 6,184,658. In order to reduce cost and weight, IC's and transistors are mounted as bare chips on this board, whereby this circuit board is further completely sealed on one side, thereby providing a shield against moisture and mechanical damage. Dedicated pads or external connecting terminals are formed on the surface opposite to the part-mounting surface of this printed circuit board. The metal strips used for coupling the dedicated pads of this printed circuit board to the leads of the battery (both not shown in U.S. Pat. No. 6,184,658) are usually soldered to these dedicated pads . These metal strips are further attached to the leads of a battery. A schematic of such a prior art battery pack is shown in FIG. 1. In this FIG. 1, the metal case of the battery forms one lead of the battery which is indicated as L2 while the other lead of the battery B is indicated with L1. The PCB whereon the protection circuitry, in this prior art case composed of several IC's and some discrete components, is placed, is denoted PCB. C1 and C2 denote the terminals of the battery pack to further functional circuits, for instance telephone or computer circuits. C2 may thereby be directly coupled to the battery case, whereas C1 may be coupled via a contact pin on a flexible connection, abbreviated with Flex PC, to a dedicated pad C of the PCB. The connection between pad C and the flex PC contact is also realized via solder. Other dedicated pads P1 and P2 of this Printed circuit board are soldered to the metal strips for further coupling to the battery leads, such as is also indicated on FIG. 1.

In such a prior art battery pack as depicted on FIG. 1, the sealed PCB could thus as well be considered as an encapsulating device for the protection circuitry. Again also in this special case, the terminals on the PCB, are always connected via additional material such as solder paste or conductive glue to a metal strip, or contact on a flexible connection.

This prior art situation is, although it made use of bare integrated circuits to save cost and weight, still space consuming. Moreover, a PCB is to be foreseen for each battery pack, and the assembly of the PCB itself as well as the forming of the solder connections to the battery pack is expensive.

SUMMARY OF THE INVENTION

An object of the present invention is to provide an encapsulating device for electronic circuitry which may optionally be used with a battery pack and which solves the aforementioned problems of space consumption and cost.

This object is achieved by the fact that the encapsulating device including at least one pin which is directly attachable to metal. In this way an encapsulating device is foreseen of which at least one of the pins is directly attachable to a metal, for instance to the metal strips coupled to the leads of a battery. This allows a direct welding to be performed which is cheaper than the classical soldering or glueing operation. In particular the present invention provides encapsulated electrical circuitry for use in a battery pack including a battery, comprising: an encapsulated portion, the encapsulated portion encapsulating the electrical circuitry, at least one connection to the electrical circuitry that extends externally of the encapsulated portion, the at least one connection being a pin for direct connection to a metal part of the battery.

In some embodiments of the encapsulating device of the invention, all of the pins are directly attachable to metal, in other embodiments part of the pins are directly attachable to metal, whereas other part of the pins are attachable to metal by means of other material. These other materials can thereby consist of conductive glue or solder.

In another aspect the encapsulating device consists of a single chip package. Alternatively, the encapsulating device may consist of a multi-component package. Single chip as well as multi-component packages allow for cheap, easy to produce, embodiments for the subject encapsulating device. The distinction between a single chip package and a multi-component package relates to the number of discrete components the electronic circuitry is composed of. In case the electronic circuitry to be encapsulated or packaged in the encapsulating device consists of a single integrated circuit, a single chip package will be used. In case the electronic circuitry consists for example of an integrated circuit and some discrete devices, a multi-component package is appropriate.

In yet another aspect, the pins of the encapsulating device may consist of separate metal plates. At least one of these separate metal plates constituting said at least one pin may include a lateral extended leg. The particular shape of some of the separate metal plates constituting the different pins or leads of the encapsulating device may thereby contribute to the reduction of the electrical resistance between the electrical circuitry and these particular pins of the package.

The present invention relates as well to a battery pack including such an encapsulating device. In this case the electrical circuitry may consist of protection circuitry for the battery pack. In battery packs, the pins that are directly attachable to metal, can be directly welded to metal strips coupled to the leads of the battery, and/or to metal strips coupled to a contact to further circuitry outside the battery pack. Furthermore, depending on the particular shape and material of the battery within the battery pack itself, some pins on the subject encapsulating device can either be attached to a lead of the battery itself, via additional material. In other embodiments, some pins can also be directly welded to a lead of the battery itself.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION

Figure 1:
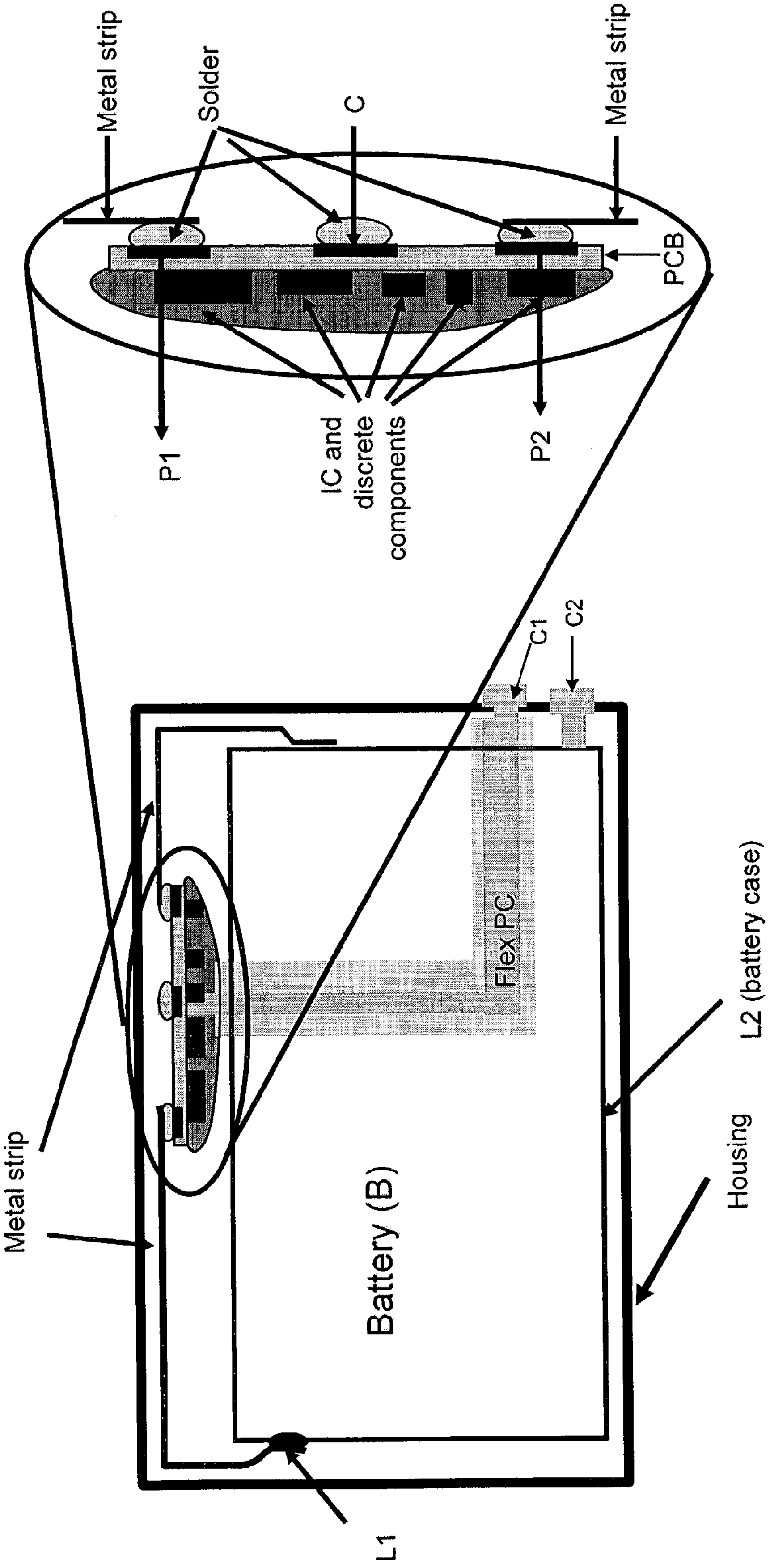
Fig. 1 Prior art
FIG. 1 represents a prior art battery pack.

The present invention will be described with respect to particular embodiments and with reference to a certain drawing but the invention is not limited thereto but only by the claims. The drawing described is only schematic and is non-limiting. In the drawing, the size of some of the elements may be exaggerated and not drawn on scale for illustrative purposes.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Furthermore, the terms first, second and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Encapsulating devices according to the invention are especially useful, but not limited to, portable applications where Li-ion and Li-polymer batteries are used (Li refers to Lithium). Nowadays such portable applications range from mobile phones, portable computers, handheld global positioning systems, etc. Li-ion batteries have the advantage of having a very high energy density in comparison with NiMH, which is the abbreviation of Nickel Metal Hydride, and other battery technologies, which result in a very compact and lightweight battery. However, because of the electrochemical system of these Li-ion batteries, they require the presence of a protection circuit in order to preserve the lifetime of the battery and to ensure a safe operation. Nowadays these protection circuits are placed on a small Printed Circuit board, abbreviated with PCB, as is for instance shown on FIG. 1. This PCB is interconnected with the battery by use of metal strips. The battery and this PCB are incorporated in the battery pack, as is also shown in FIG. 1.

Such protection circuits are commonly known; an example of them being shown in the aforementioned U.S. Pat. No. 6,184,658.

Since the protection circuit schematic itself is however not subject of the present invention, this will not be further discussed into detail in the remainder of this document.

For portable consumer applications the size, weight and price of the device are important differentiating factors. To obtain them, it is key to have the battery pack as small, light and cheap as possible. Therefore the electronic circuitry that is added to the battery pack should have minimal effect on cost, weight and size. The small printed circuit boards that are most often used today has several disadvantages: they occupy a lot of space and are rather expensive, both to manufacture and to mount into the battery pack. Furthermore, a dedicated printed circuit board has to be designed and manufactured for each battery pack design. This results in a large stock of parts and in complicated logistics for the company which is assembling these boards and the battery packs.

In some prior art embodiments parts of the protection circuitry were integrated within one integrated circuit, whereas other parts remained external to this circuit such as some resistors, fuses or capacitors. In other prior art embodiments the total protection circuitry formed part of an integrated circuit.

In either situation however this protection circuit was placed on a printed circuit board including dedicated pads for further coupling, for instance via soldering, to the metal strips coupled to the battery leads. This situation is depicted in FIG. 1.

The protection circuit further interfaces with the remainder of the chips of the portable apparatus such as cellular phone or computer chips or circuitry. The coupling or connection to these devices was for instance realised by means of soldering or spring contacts, denoted C1 and C2. C1 is then further coupled to a dedicated pad, for instance C on the PCB, via a flexible connection, a contact of which is soldered to C, as is also shown on FIG. 1. C2 is coupled to a lead of the battery via a small metal strip (not shown on this figure) which is also attached by soldering. However other techniques to the coupling to the battery or external circuitry exist in prior art.

The invention relates to a standard single encapsulating device for one or more devices composing electronic circuitry, such as the aforementioned battery protection circuit. The key feature of this encapsulating device is that it includes one or more pins or leads that are directly attachable, e.g. by means of welding, to a metal, such as for instance the metal strips commonly coupled to the leads of a battery, or even to the battery case itself. In some particular embodiments of such an encapsulating device all pins are directly attachable by means of contact welding or ultrasonic welding. The encapsulating device can therefore be introduced directly in the manufacturing flow of battery packs as a standard part. In such a way the encapsulating device can be attached to the battery directly using the standard techniques that are used commonly to build a battery pack from battery cells such as the already mentioned use of welding to metal strips.

In other embodiments of the encapsulating device some part of the pins are directly weldable to metal strips, whereas another part of the pins of this encapsulating device are still merely attachable to metal by means of another material such as conductive glue or solder.

Figure 2B:
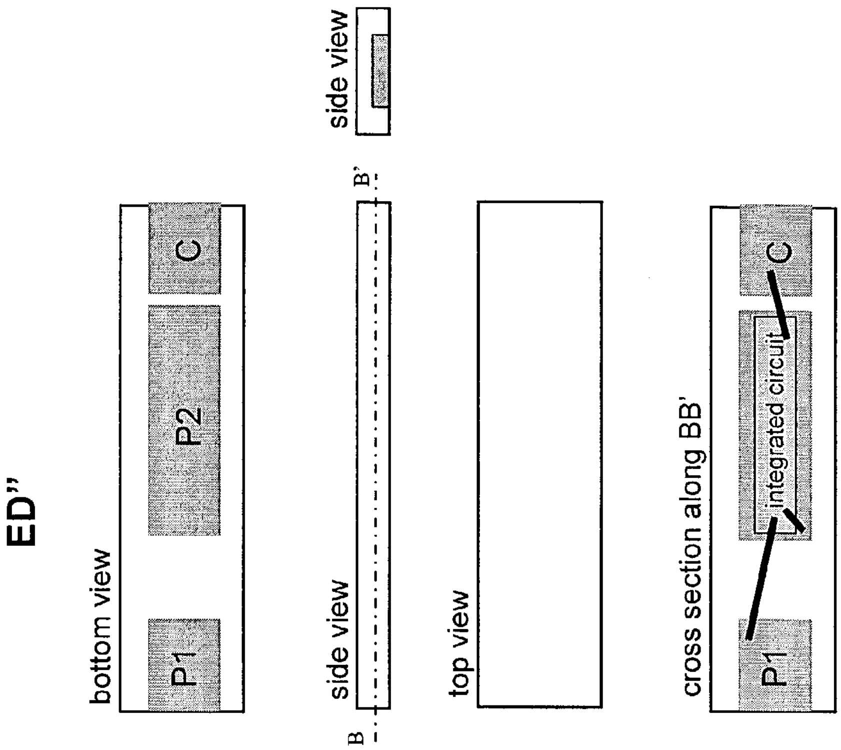
FIGS. 2*a* and *b* represent two embodiments of encapsulating devices according to the present invention.
Figure 2A:
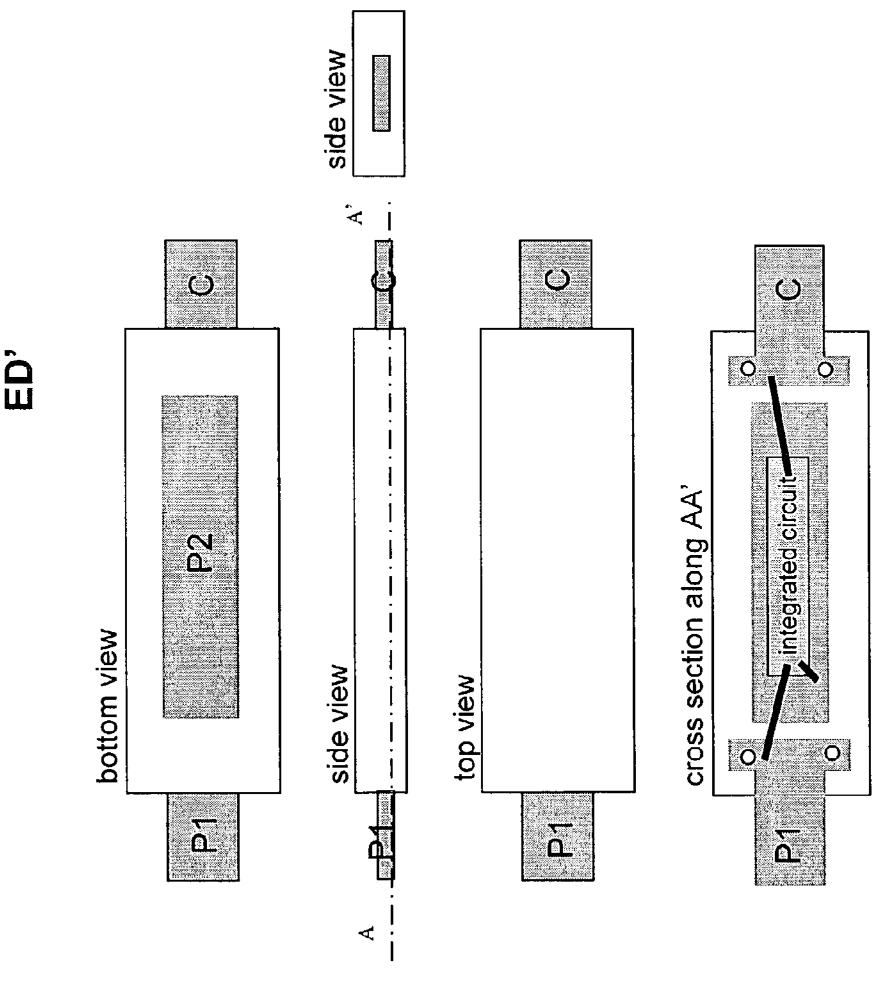

Principal schematics, already depicting two possible embodiments ED' and ED" of such an encapsulating device of the invention are shown in FIGS. 2*a* and 2*b*. Both figures respectively shows a bottom view, two side views, a top view and a cross section along indicated axes of a single chip package. The encapsulating device depicted in FIGS. 2*a* and *b* both include 3 pins. However other embodiments with more or less pins are also included within the scope of the present invention. The pins depicted in FIGS. 2*a* and *b* are denoted P1, P2 and C. For the application as encapsulating device for protection circuitry of batteries in battery packs, in most embodiments pins P1 and C are directly weldable to the Nickel metal strips used for further interconnection to the battery leads. Therefore the materials used for the production of these pins are typically Iron Nickel alloys or Copper Alloys such as for instance Iron Nickel alloy 42 or Copper Alloy Ollin 194. The same material can be used for pin P2, such as to obtain a uniform leadframe for the package constituting ED' and ED". Therefore P2 could also be welded to metal, for instance the metal case of a battery. However, in most battery packs, whereby lead L2 corresponds to the metal case of the battery, P2 is attached to this metal case of the battery by means of soldering or conductive glue.

The metal leadframe comprising the different leads or pins as described in the previous paragraph may also be plated with metal alloys suitable for soldering such as for instance Tin, Palladium or Nickel alloys.

The cross section of both FIGS. 2*a* and *b* shows one integrated circuit mounted within the package, and coupled by means of one or more sets of bond wires to the respective pins P1, P2 (at the bottom) and C. The figures schematically show the use of 3 bond wires. However in practical situations 3 sets of bondwires in parallel are used such as to reduce the total electrical resistance of these bonding wires.

The embodiment depicted in FIG. 2*a* has pins P1 and C extending outside the plastic or ceramic package. The embodiment depicted in FIG. 2*b* has pins P1 and C incorporated at the bottom of the package. In both embodiments the P2 pin or lead is incorporated in the bottom of the package.

Figure 3A:
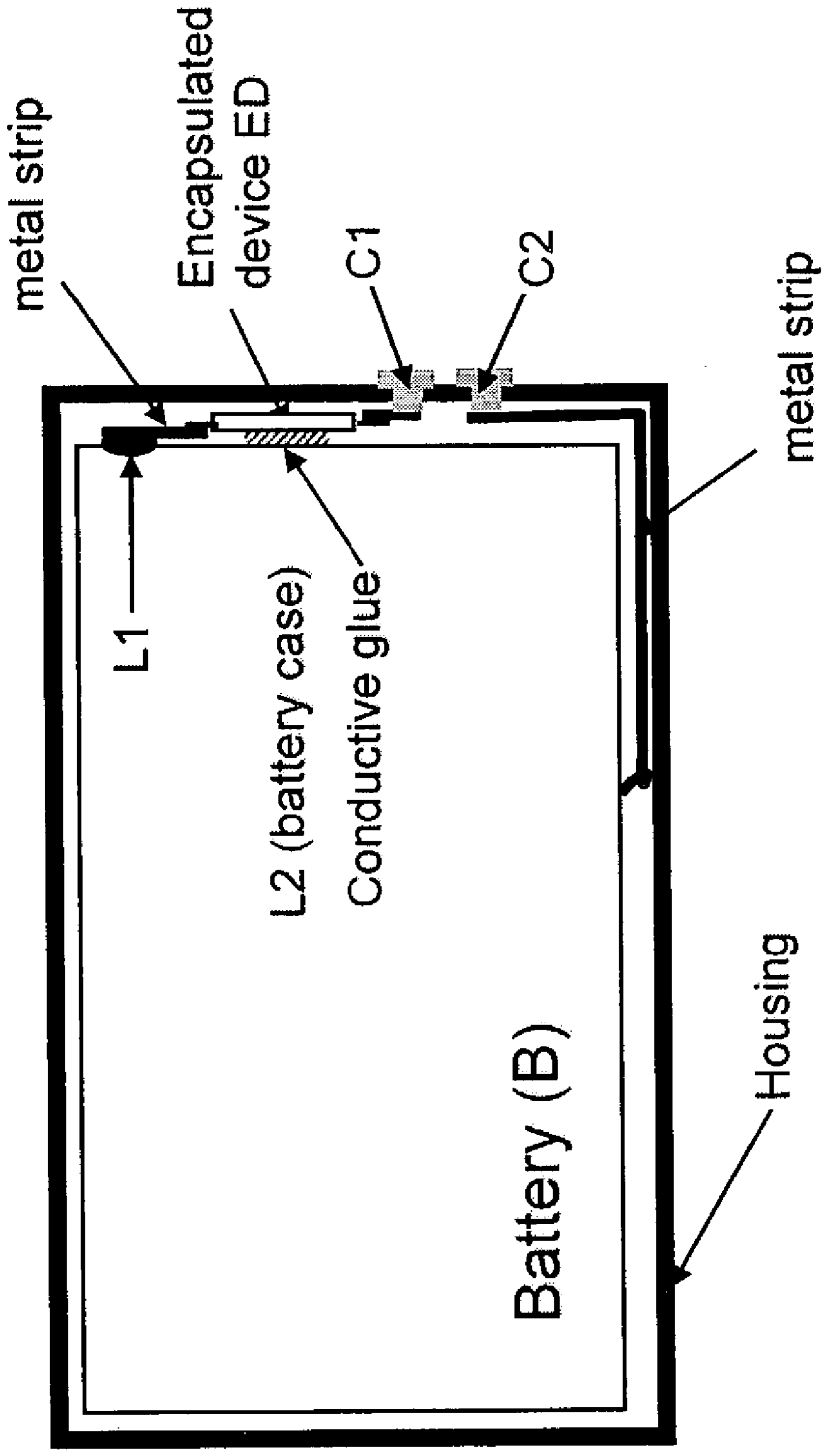
FIGS. 3*a* and 3*b* show how an encapsulating device according to embodiments of the present invention may be used within a battery pack.
Figure 3B:
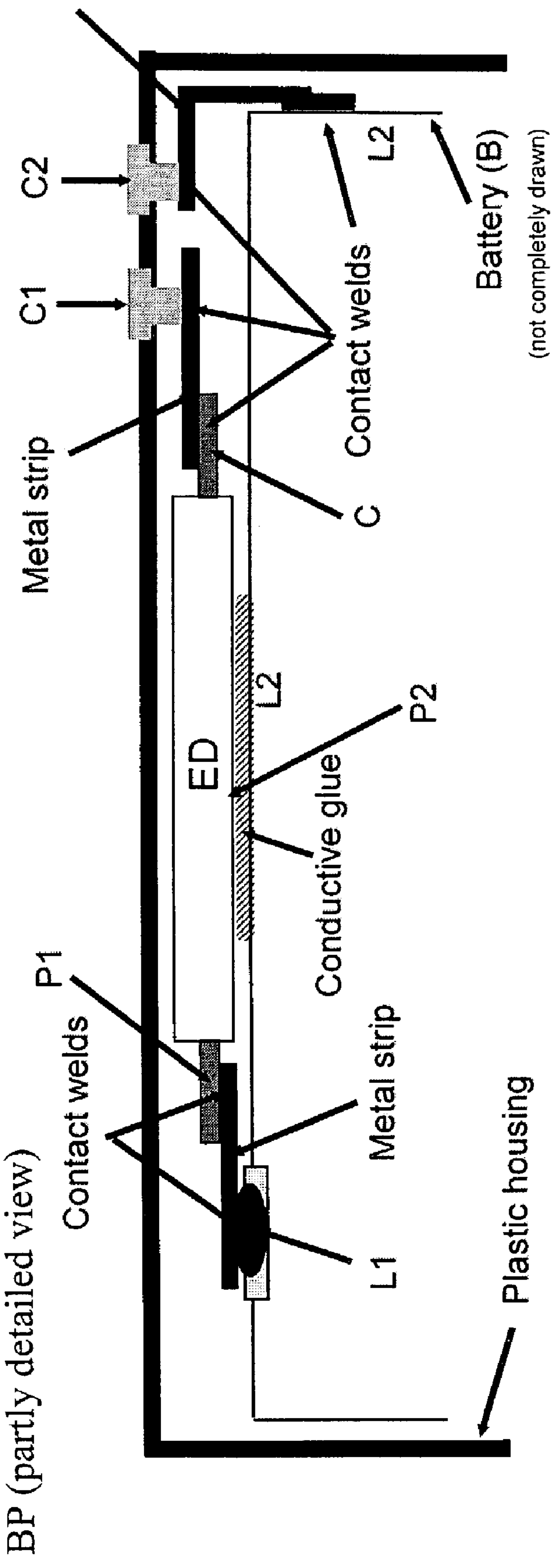

By means of the encapsulating device depicted in FIG. 2, the protection circuit is now directly mountable to the battery, within a battery pack such as is depicted in FIGS. 3*a* and 3*b*. FIG. 3*b* thereby merely shows an enlargement of the right part of the FIG. 3*a,* showing into greater detail how an encapsulating device ED of the invention is mounted within the battery pack BP itself. FIG. 3*a* shows the total battery pack BP, including a battery B having two leads L1 and L2. In this particular embodiment of the battery pack, lead L2 consists of the metal case of the battery itself. This lead is connected via conductive glue to bottom pin P2 of the encapsulating device ED as can be better observed from FIG. 3*b*. The other lead L1 of the battery is coupled to a metal strip. This metal strip is welded to pin P1 of the encapsulating device ED. Pin C of ED is also welded to a metal strip which is further connected to external contact C1. This contact C1 is intended for further coupling of the battery pack to external circuitry. The same is true for contact C2, which is in this embodiment of battery pack of FIG. 3*a,* also coupled to a metal strip coupled to the battery case. The battery pack is completely surrounded by a plastic housing, except at the locations of the external contacts C1 and C2.

Figure 4A:
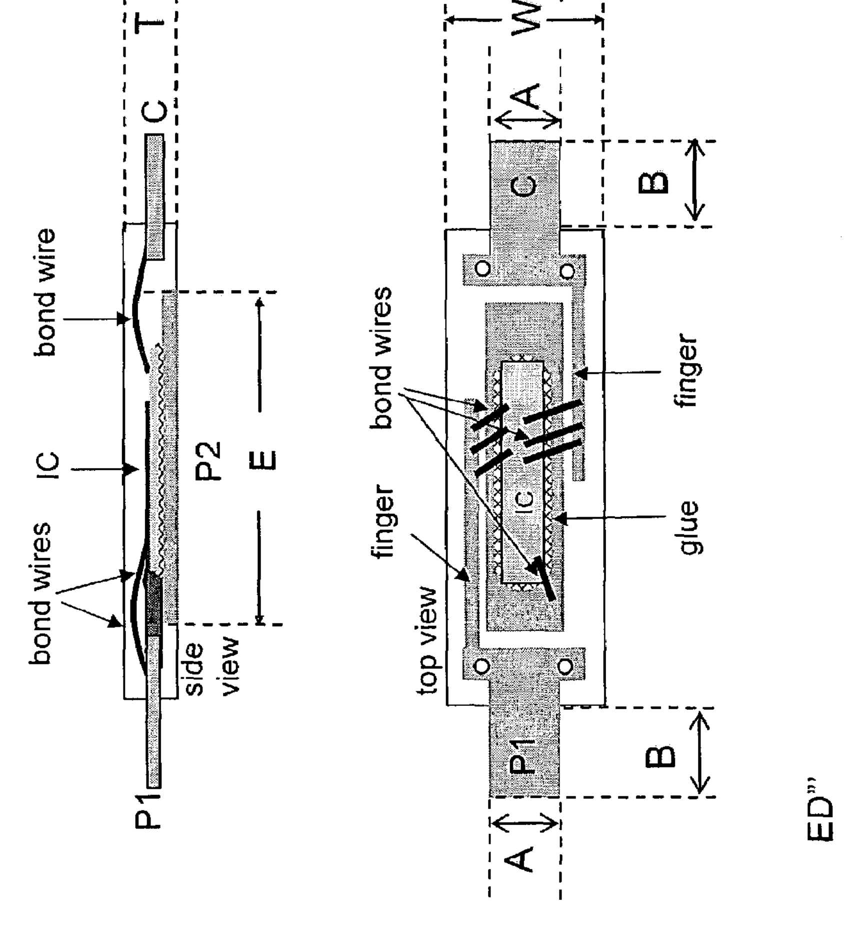
FIG. 4 shows two more embodiments of an encapsulating device according to the present invention.

FIGS. 4*a* and *b* further show cross sections of two other embodiments ED''' and ED'''' of an encapsulating device of the invention. The embodiment shown in FIG. 4*a* differs from the one depicted in FIG. 2*a* in that the metal leads or terminals for pins P1 and C now include two laterally extended fingers as is shown in these figures. The function of these fingers is to enable to reduce the length of the bonding wires, thereby further reducing their electrical resistance. The two dots in the leadframe parts for P1 and C1, which were also shown in FIG. 2*a,* are holes in the leadframe that can be filled with plastic molding in case of a plastic package. This provides mechanical fixation of the surfaces on both sides of the terminals with each other, thereby enhancing the mechanical strength of this package. This construction also enables to reduce the size of the package and allows the package to be easily employable in production environments, again reducing cost.

Figure 4B:
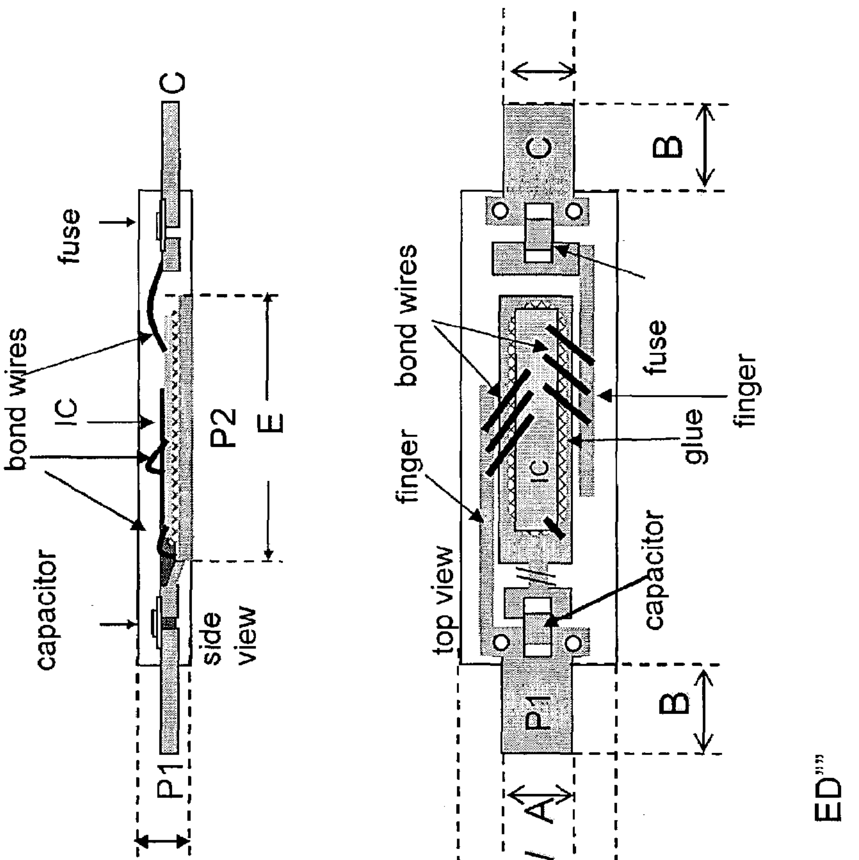

FIG. 4*b* is similar to FIG. 4*a,* but here the leadframe includes an extra metal plate. This is to enable further incorporation of some other discrete components such as a capacitor and a fuse. Both figures also indicate some of the bonding wires between the integrated circuit and the pins P1, P2 and C. The top views of both figures also show that the leads P1 and C are slightly elevated with respect to P2.

FIG. 4*b* thus depicts a multi-component package, whereas FIG. 4*a* still depicts a single-chip package. The dimensions A, B, and E indicated in these figures are related to the technique used for attaching these pins P1, C and P2 to the external metal strips, leads or contacts. In case welding is used, these dimensions thus relate to the size of the welding electrode, which implies that, at the time of the invention, these should be typical equal or larger than 3 mm. However, for other welding electrodes, these dimensions can be larger or smaller.

For battery pack applications the dimension W as indicated on FIGS. 4*a* and *b,* is related to the size of the battery. For present cellular phone battery pack applications, the width W is typically equal or less than 4.5 mm. The thickness T of the encapsulating device should be as small as possible for these applications, being typically less then 1.5 mm in present embodiments. However, the encapsulating device ED can be used in many other applications, whereby other restrictions inherent to the applications may result in other dimensions chosen for realising ED.

While the principles of the invention have been described above in connection with specific apparatus, it is to be clearly understood that this description is made only by way of example and not as a limitation on the scope of the invention, as defined in the appended claims.

What is claimed is:

1. Encapsulated protection electrical circuitry for use in a battery pack including a battery, comprising:

an encapsulated portion, the encapsulated portion encapsulating the protection electrical circuitry, and at least one connection to the protection electrical circuitry, the at least one connection being a pin for direct connection to a metal part of the battery, the pin having two ends, one end being encapsulated in the encapsulated portion and the other end of the pin extending from and externally of the encapsulated portion.

2. Encapsulated electrical circuitry according to claim 1, further comprising at least one other pin which is attachable to metal by means of an additional material.

3. Encapsulated electrical circuitry according to claim 2, wherein said additional material comprises one of conductive glue and solder.

4. Encapsulated electrical circuitry according to claim 1, wherein said pin is directly attachable to the metal part via welding.

5. Encapsulated electrical circuitry according to claim 1, wherein said encapsulating circuitry is included within one of a single chip package and a multi-component package.

6. Encapsulated electrical circuitry according to claim 5, wherein the pins of said encapsulating device comprise separate metal plates.

7. Encapsulated electrical circuitry according to claim 6, wherein at least one of said separate metal plates constituting said pin includes a lateral extended leg.

8. Encapsulated electrical circuitry according to claim 1, wherein said pin is made of a nickel, an iron nickel or a copper alloy.

9. Encapsulated electrical circuitry according to claim 1, wherein said pin is plated with tin, palladium or nickel or an alloy thereof.

10. Battery pack including a battery and encapsulated protection electrical circuitry, comprising:

an encapsulated portion, the encapsulated portion encapsulating the protection electrical circuitry, and at least one connection to the protection electrical circuitry, the at least one connection being a pin for direct connection to a metal part of the battery, the pin having two ends, one end being encapsulated in the encapsulated portion and the other end of the pin extending from and externally of the encapsulated portion.

11. Battery pack according to claim 10, further comprising at least one other pin which is attachable to metal by means of an additional material.

12. Battery pack according to claim 11, wherein said additional material consists of one of conductive glue and solder.

13. Battery pack according to claim 11, wherein said other pin is directly attached to a metal strip coupled to a contact to further circuitry outside said battery pack.

14. Battery pack according to claim 11, wherein said other pin is attached to a lead of the battery, by means of said another material.

15. Battery pack according to claim 10, wherein said pin is directly attached to the metal part via welding.

16. Battery pack according to claim 10, wherein said encapsulating circuitry is included within one of a single chip package and a multi-component package.

17. Battery pack according to claim 16, wherein pins of said encapsulating device comprise separate metal plates.

18. Battery pack according to claim 17, wherein at least one of said separate metal plates constituting said pin includes a lateral extended leg.

19. Battery pack according to claim 10 wherein said electrical circuitry comprises battery protection circuitry.

20. Battery pack according to claim 10, wherein said pin is directly attached to a metal strip coupled to a lead of the battery included in the battery pack.

* * * * *